United States Patent
Tsai

(10) Patent No.: US 8,100,417 B2
(45) Date of Patent: Jan. 24, 2012

(54) HANDCART

(76) Inventor: Haiming Tsai, Tainan Hsien (TW)

( * ) Notice: Subject to any disclaimer, the term of this patent is extended or adjusted under 35 U.S.C. 154(b) by 185 days.

(21) Appl. No.: 12/657,274

(22) Filed: Jan. 19, 2010

(65) Prior Publication Data

US 2011/0175307 A1    Jul. 21, 2011

(51) Int. Cl.
  *B62B 1/00*    (2006.01)
  *B62B 3/00*    (2006.01)
(52) U.S. Cl. .................. 280/47.18; 280/47.371
(58) Field of Classification Search .............. 280/47.18, 280/47.17, 47.315, 47.34, 47.371; 403/161, 403/162; 16/436, 437, 900
  See application file for complete search history.

(56) References Cited

U.S. PATENT DOCUMENTS

| | | | | |
|---|---|---|---|---|
| 3,655,297 A | * | 4/1972 | Bolen et al. ..................... 416/72 |
| 4,448,434 A | * | 5/1984 | Anderson ....................... 280/40 |
| 4,969,660 A | * | 11/1990 | Spak ............................. 280/646 |
| 6,101,678 A | * | 8/2000 | Malloy et al. .................. 16/438 |
| 6,341,406 B1 | * | 1/2002 | Beckman ..................... 16/113.1 |
| 6,877,764 B2 | * | 4/2005 | Sagol .......................... 280/655.1 |
| 7,475,888 B2 | * | 1/2009 | Craig et al. ................ 280/47.18 |
| 7,600,765 B2 | * | 10/2009 | Tsai ........................... 280/47.18 |
| 2004/0201186 A1 | * | 10/2004 | Tornabene et al. ............. 280/30 |
| 2008/0197590 A1 | * | 8/2008 | Tsai ........................... 280/47.18 |

* cited by examiner

*Primary Examiner* — J. Allen Shriver, II
*Assistant Examiner* — James M Dolak

(57) ABSTRACT

The invention relates to a handcart composed of a main frame, four wheel sets properly assembled under the main frame, a grip, two positioning sleeves, and two joint assemblies installed between the main frame and the grip for changeably connecting the main frame with the grip. The grip can be aligned flat or become 90° to the main frame by means of the joint assemblies. Then the handcart can be transformed as a two-wheel handcart or a four-wheel one by handling the grip through movement of the pivotal connecting bases of the joint assemblies and combining the grip with the positioning sleeves movably fitted in positioning holes of the grip.

2 Claims, 6 Drawing Sheets

HANDCART

BACKGROUND OF THE INVENTION

1. Field of the invention

This invention relates to a handcart, particularly to one able to be alternatively used as a two-wheel or a four-wheel handcart by means of two joint assemblies.

2. Description of the Prior Art

Commonly, a conventional two-wheel handcart and four-wheel handcart are used as two different means, depending on practical need. In other words, each of the conventional handcarts can work only in a single way. With different shapes or packages of objects, some of them are suitable to be delivered by the two-wheel handcart and some are suitable to be delivered by the four-wheel handcart. Therefore, if both of the handcarts have to be used alternatively, they have to be of course prepared separately, not only increasing cost, but also occupying more space. Although the U.S. Pat. No. 6,938,905 and U.S. Pat. No. 7,600,765 patented by this inventor were provided to overcome the defects mentioned above, but it still have something to be improved, such as disassembly and uneasiness in positioning stably the grip bent against the main frame and positioning by the pivotal base of the joint provided with an U-shaped opening, etc.

SUMMARY OF THE INVENTION

The objective of this invention is to offer a handcart alternately usable as a two-wheel or a four wheel handcart.

The main characteristics of the invention is two joint assemblies consisting of two pivotal connecting blocks, two left pivotal connecting bases, two right connecting bases. The pivotal connecting blocks are respectively provided with two aligned projections in an intermediate portion, and the two left and the two right pivotal connecting bases are respectively provided with a vertical groove, which is provided with a blocking surface at an end and a vertical wall.

BRIEF DESCRIPTION OF DRAWINGS

This invention is better understood by referring to the accompanying drawings, wherein.

DETAILED DESCRIPTION OF THE PREFERRED EMBODIMENT

Figure 1:
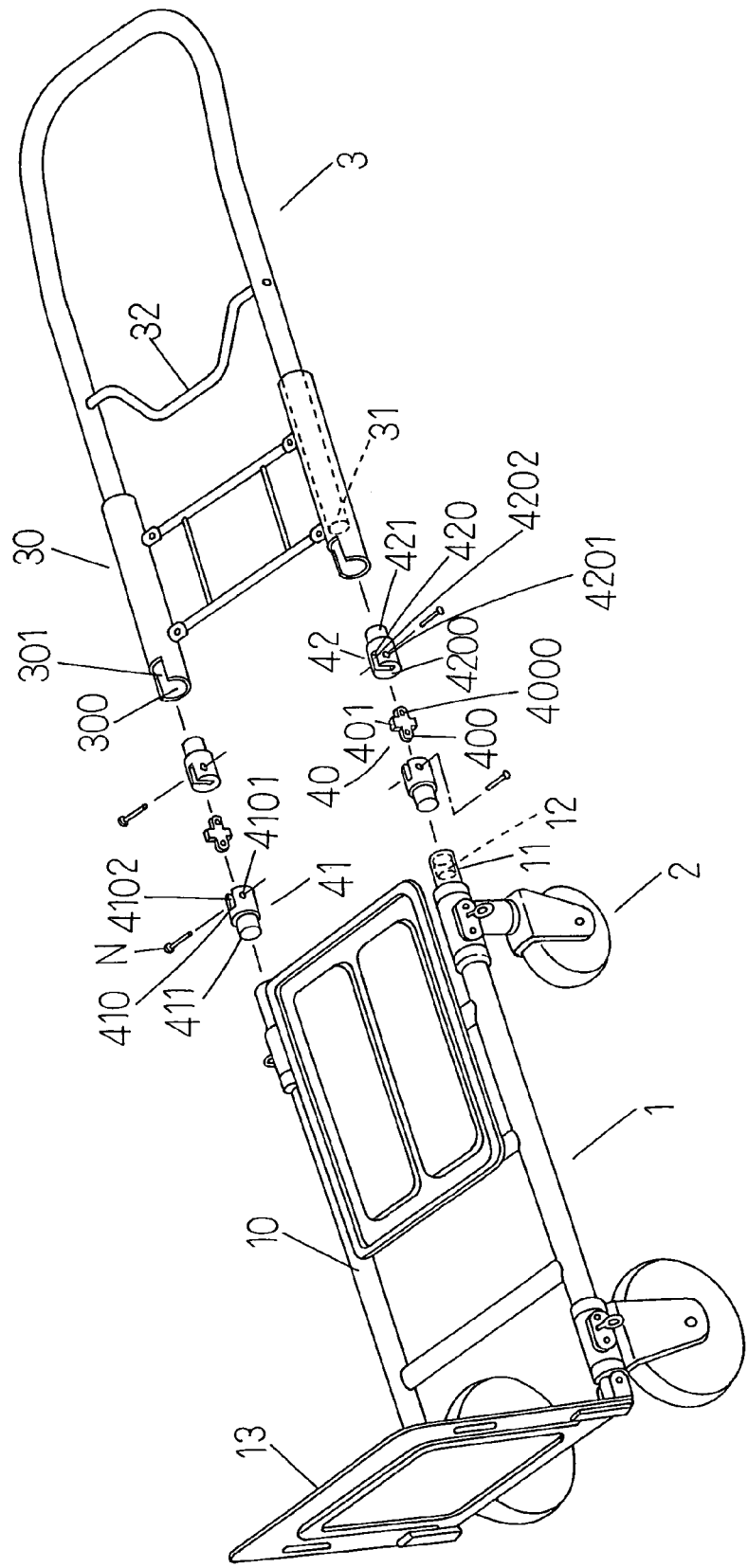
FIG. 1 is an exploded perspective view of a preferred embodiment of a handcart in the present invention.
Figure 2:
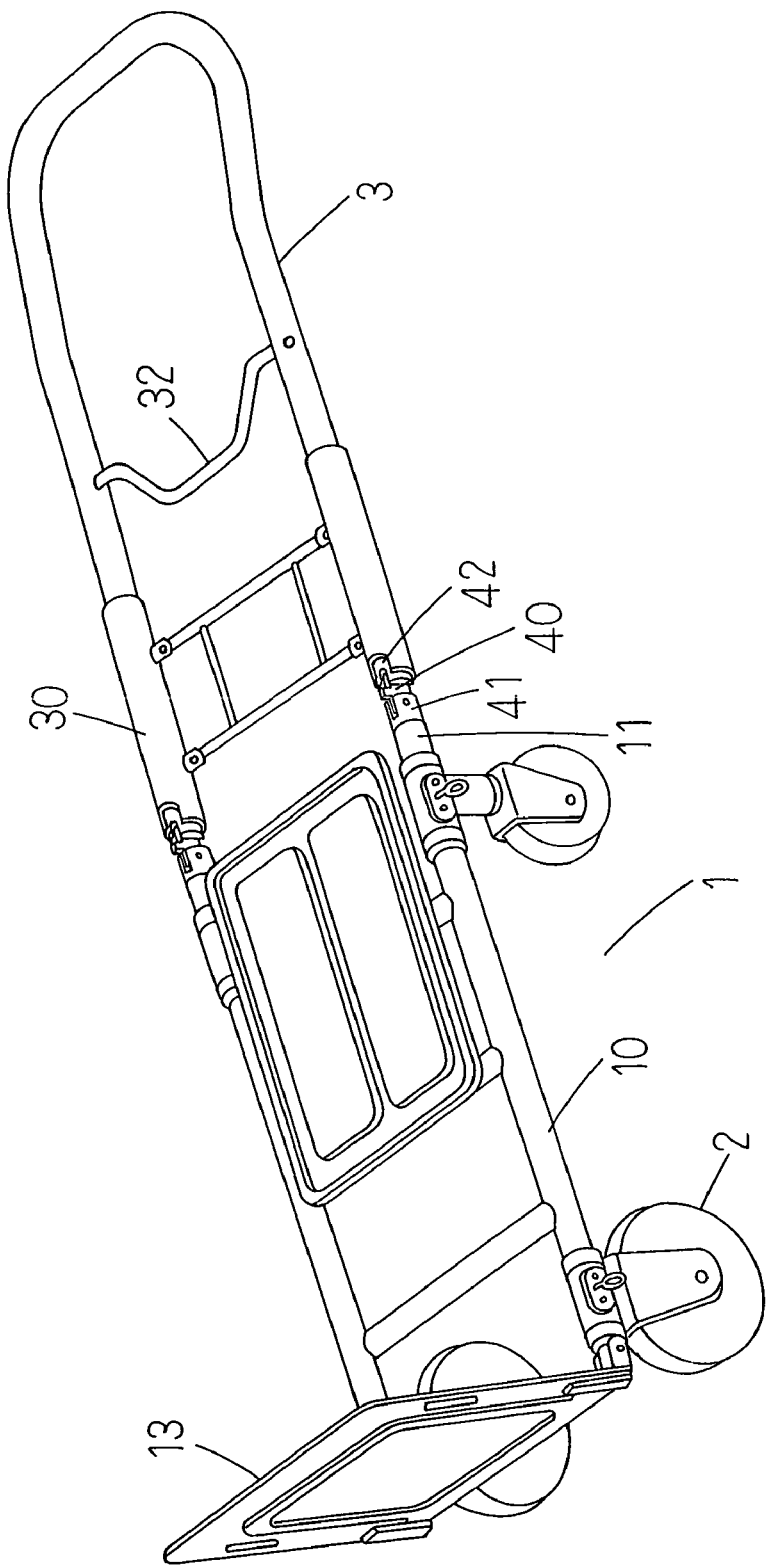
FIG. 2 is a perspective view of the preferred embodiment of a handcart in the present invention.
Figure 3:
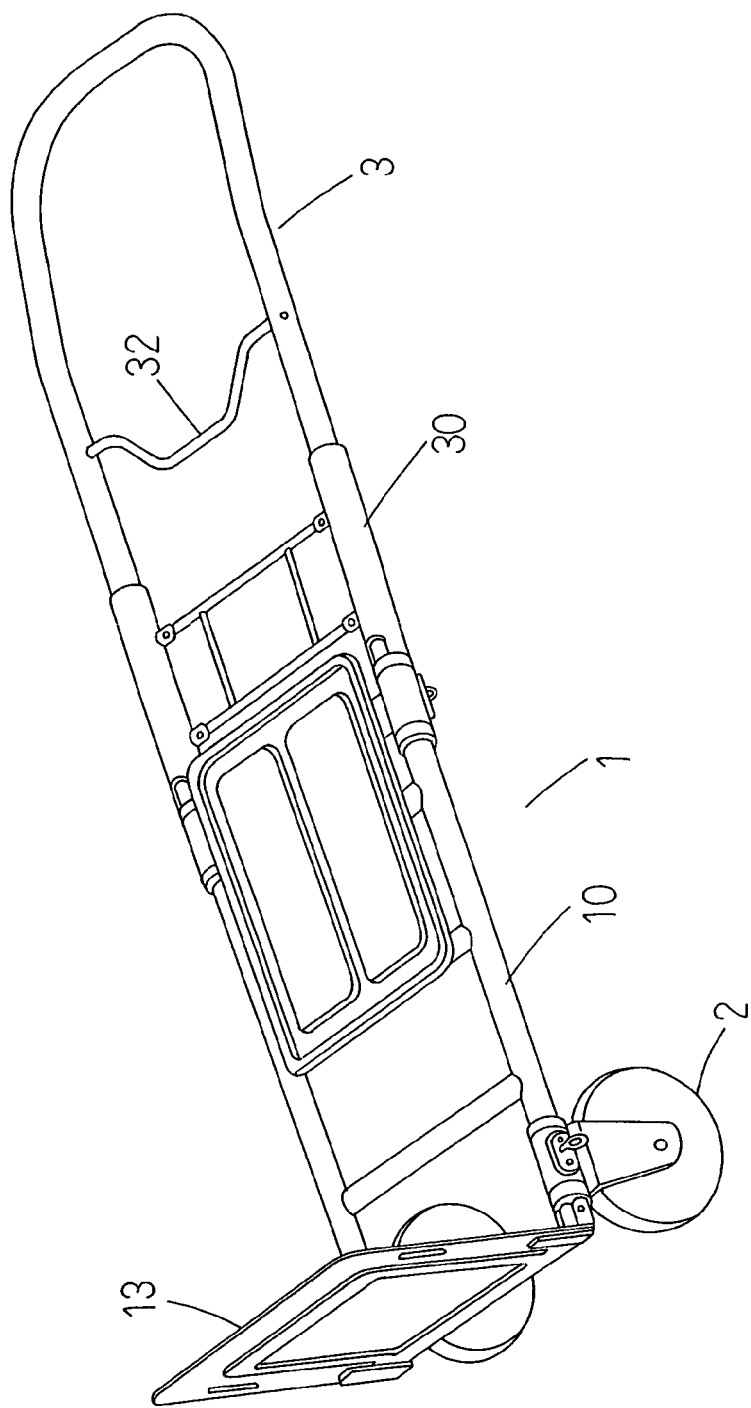
FIG. 3 is a perspective view of the preferred embodiment of a handcart in the present invention, showing it transformed as a two-wheel handcart.
Figure 4:
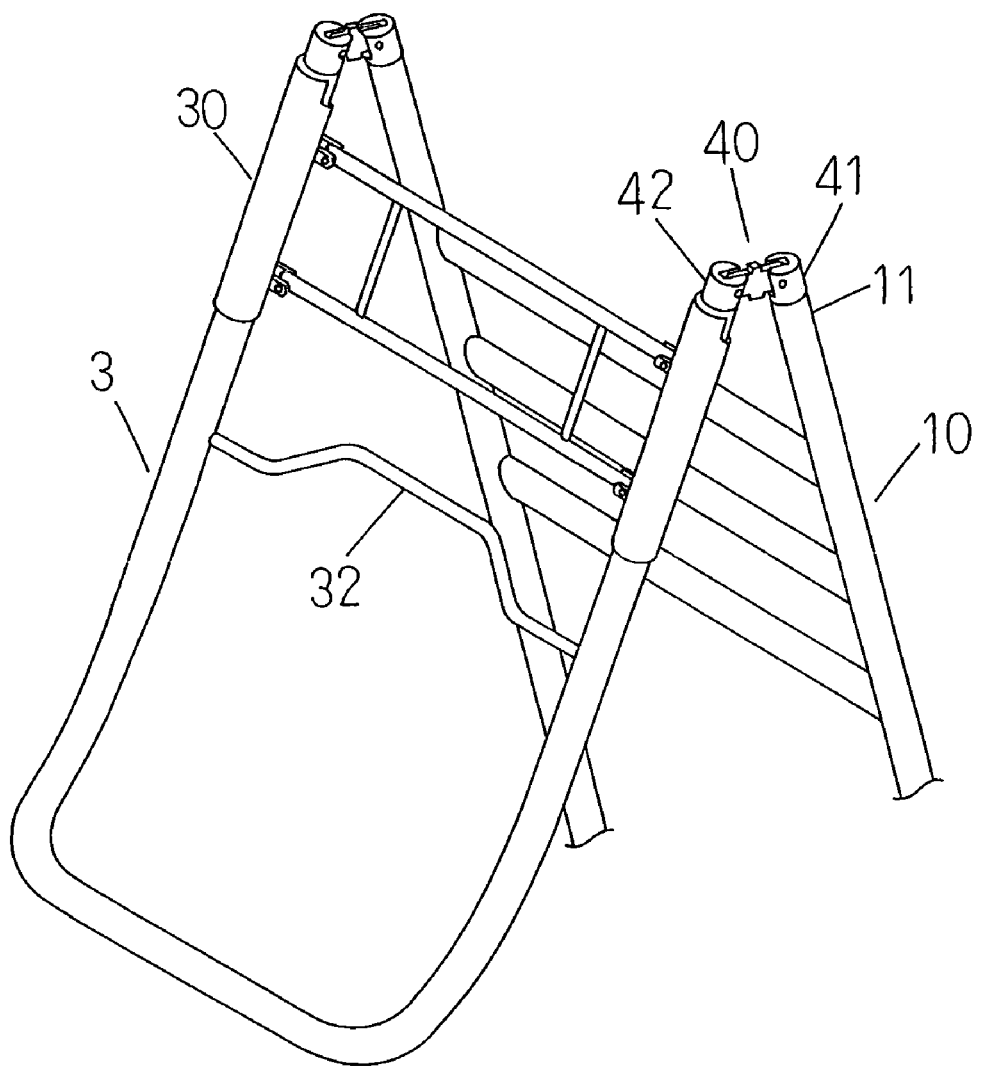
FIG. 4 is a perspective view of a joint assembly adjusted to let a grip bent against a main frame in the present invention.
Figure 5:
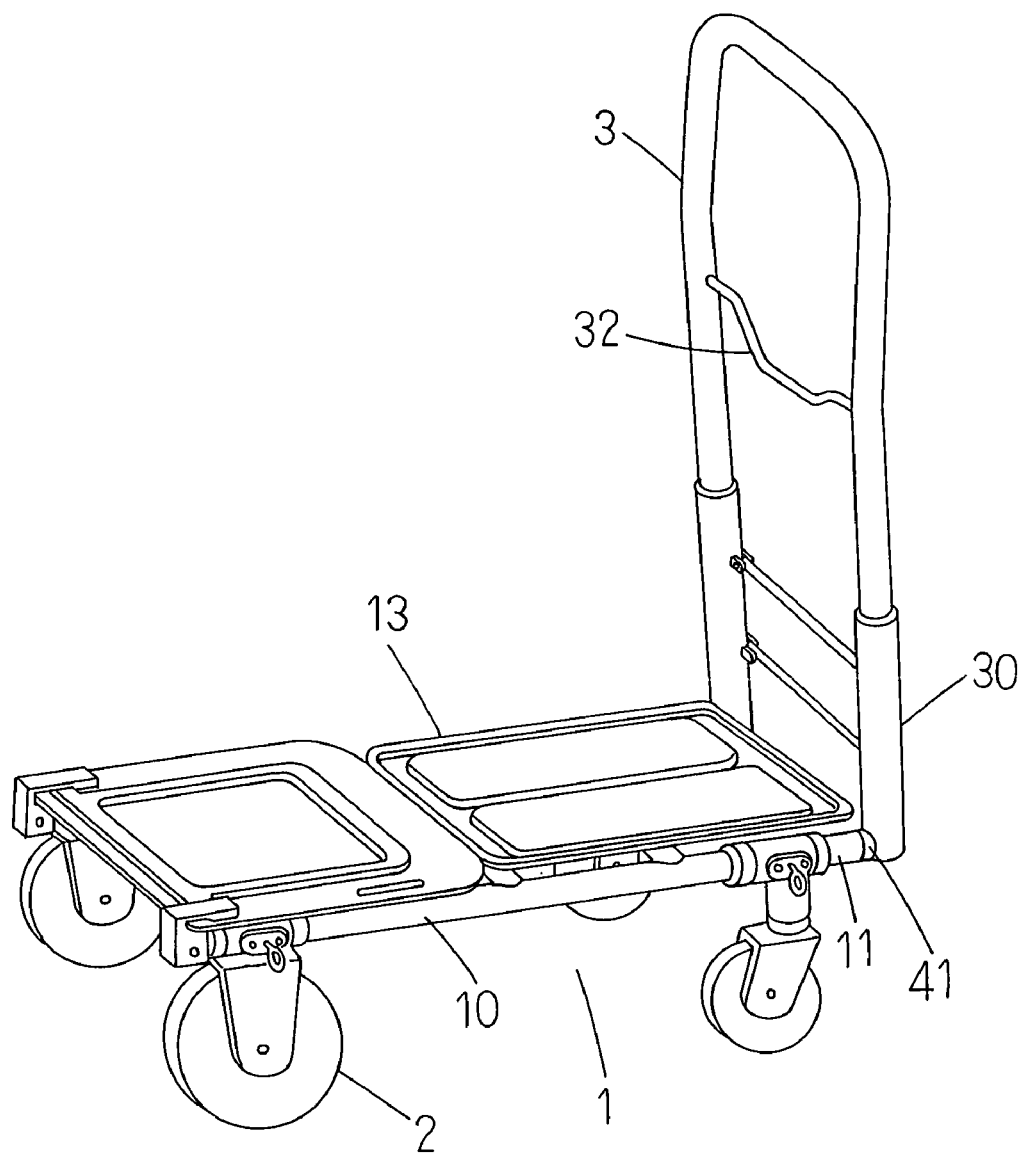
FIG. 5 is a perspective view of the preferred embodiment of a handcart in the present invention, showing it transformed as a four-wheel handcart.
Figure 6:
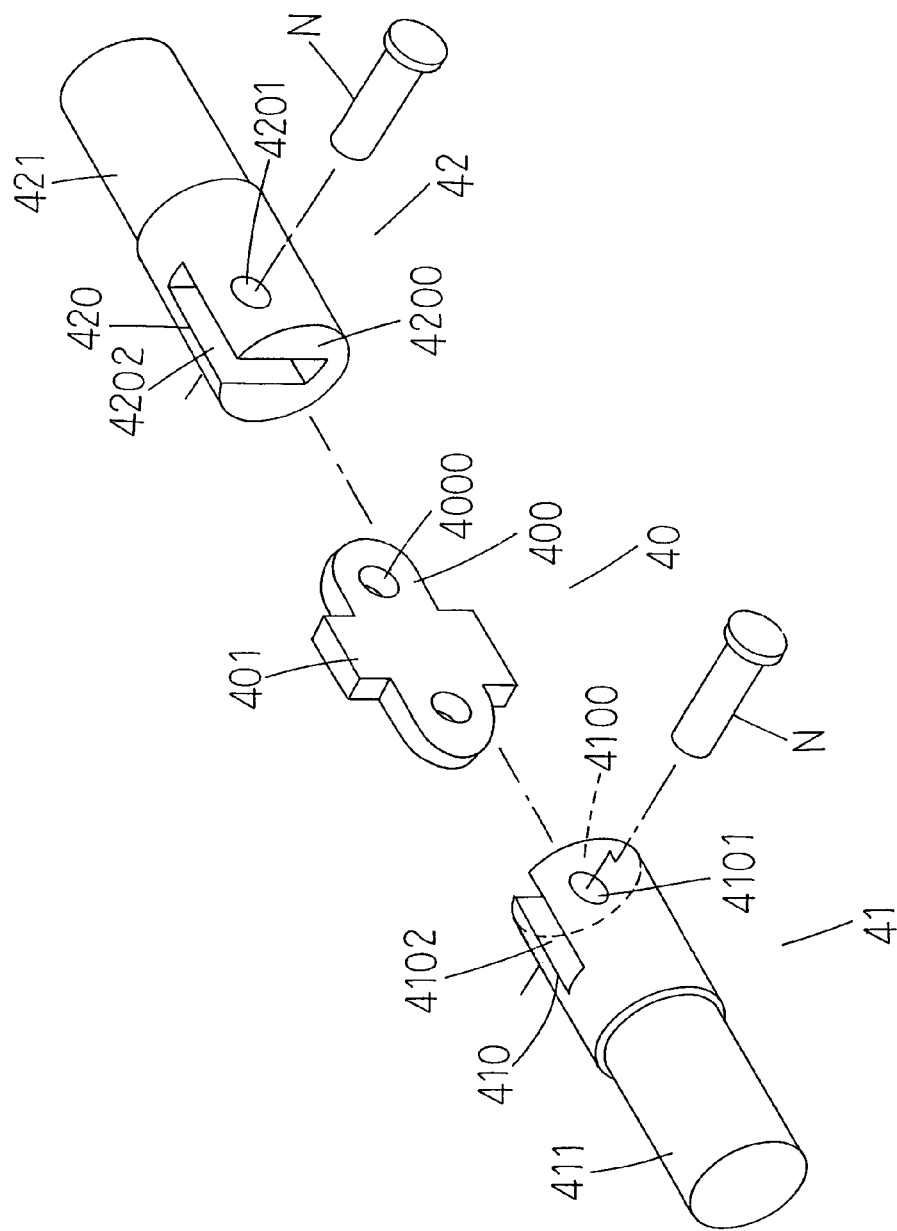
FIG. 6 is an exploded perspective view of the joint assembly in the present invention.

As shown in FIGS. 1~6, a preferred embodiment of a handcart in the present invention includes a main frame 1, four wheel sets 2, a grip 3, two positioning sleeves 30, two joint assemblies 4, and plural positioning elements (N).

The main frame 1 is provided with a frame rod 10 that has two ends provided with a positioning member 11 and a positioning hole 12 respectively. A blocking panel 13 is covered on the frame rod 10.

Each of the wheel sets 2 is assembled under the frame rod 10.

The grip 3 is assembled with the frame rod 10 of the main frame 1, having a fitting portion 31 in two ends respectively and a positioning bar 32 installed laterally between two parallel portions of the grip 3.

Then the positioning sleeve 30 fits movably around each end of the grip 3, having a center hole 300 fitting around the fitting portion 31 of the grip 3 so that the positioning sleeve can move back and forth relative to the grip 3. The positioning sleeve 30 is further provided with a U-shaped positioning groove 301 cut at its bottom end.

The two joint assemblies 4 are respectively assembled between the frame rod 10 of the main frame 1 and the grip 3, provided with a pivotal connecting block 40, a left pivotal connecting base 41, and a right pivotal connecting base 42. The pivotal connecting block 40 is nearly cross-shaped and formed with a semicircular pivotal member 400 respectively at two—left and right—ends and bored with a pivotal hole 4000, and two aligned—one upper and one lower—projections 401 in the intermediate portion. The left and the right pivotal connecting bases 41 and 42 are respectively provided with a vertical groove 410, 420 at an inner end and a circular fitting portion 411, 421 at the outer end. The vertical grooves 410 and 420 are L-shaped and respectively provided with a blocking surface 4100, 4200 on the inner end. The vertical grooves 410 and 420 are respectively provided with a vertical wall 4102, 4202.

The positioning elements (N) are used to keep the pivotal connecting bases 41 and 42 in place after the pivotal connecting block 40 is combined with the two pivotal connecting bases 41 and 42, with the two semicircular pivotal members 400 respectively fitted in the vertical groove 410, 420 of the two pivotal connecting bases 41, 42. Thus, the two pivotal connecting bases 41 and 42 may be swung up for nearly degrees relative (or vertical) to the pivotal connecting block 40.

In assembling, the pivotal connecting bases 41 and 42 are connected together with the pivotal connecting blocks 40 by means of the positioning elements (N) inserted in the pivotal holes 4101 and 4201, assembling the joint assembly 4 initially. Then the fitting portions 411 and 421 are respectively fitted with the positioning holes 12 of the frame rod 10 of the main frame 1 and also with the positioning sleeve 30 combined with the grip 3, finishing the whole assembly of the handcart.

In using, when only two wheel sets of the invention are to be used, the grip 3 is moved to align with the main frame 1, and then the pivotal connecting bases 41 and 42 of the joint assemblies 4 are automatically moved to align with the main frame 1 and the grip 3, and the semicircular pivotal member 400 of the pivotal connecting blocks 40 can easily turn in the vertical grooves 410 and 420 of the pivotal connecting bases 41 and 42. When the projections 401 of the pivotal connecting blocks 40 contact with the blocking surfaces 4100 and 4200 of the vertical grooves 410 and 420, the grip 3 and the main frame 1 have become aligned. Subsequently the positioning sleeves 30 are pushed inward, covering totally the joint assemblies 4 and kept them in place, finishing the two-wheel handcart.

When this handcart is to be used as a four wheel one, the wheels of the wheel set 2 are to be adjusted in proper place, and then the grip 3 together with the positioning sleeves 30 is pulled up to be bent for about 90° against the main frame 1. Then the positioning sleeves 30 are to be pushed down and cover the pivotal connecting bases 41 totally, with the pivotal connecting bases 42 received in the U-shaped positioning grooves 301 stably. Now, this handcart has become a four-wheel one.

The invention has the following advantages as can be seen from the foresaid description.

1. The grip 3 can be kept stably in position by the positioning sleeves 30 and the joint assemblies 4, impossible to move at random when the handcart is collapsed in a flat condition.

2. The main frame 1 and the grip 3 are adjusted by the joint assemblies 4 with correct movement and convenience.

3. The invention can be alternatively used as a two-wheel and four-wheel handcart according to a user's need, achieving a convenient multi-function handcart.

4. The wheel sets 2 and the grip 3 can be collapsed in a minimum bulk for economic delivery or saving space, because the wheels and the grip 3 are foldable.

While the preferred embodiment of the invention has been described above, it will be recognized and understood that various modifications may be made therein and the appended claims are intended to cover all such modifications that may fall within the spirit and scope of the invention.

What is claimed is:

1. A handcart comprising:
   a main frame provided with a frame rod that has two ends respectively provided with a positioning member and a positioning hole;
   a grip having two ends pivotally assembled with a positioning sleeve which is also pivotally combined with said frame rod of said main frame via two joint assemblies;
   said positioning sleeve movably fitting around said each end of said grip and provided with a U-shaped positioning groove at an end;
   said two joint assemblies installed between said main frame and said grip, said joint assemblies enabling said grip to become aligned to said main frame or to become vertical to said main frame;
   characterized by said joint assemblies respectively consisting of a pivotal connecting block, a left pivotal connecting base and a right pivotal connecting base, said pivotal connecting block having one upper and one lower projection in an intermediate portion, said pivotal connecting bases provided with a vertical groove, said vertical groove formed with a blocking surface at an end and a vertical wall; and
   said pivotal connecting block of said joint assembly possibly allows said left pivotal connecting base and said right pivotal connecting base to swing up for nearly 90° with said vertical wall of said vertical groove of said left and said right pivotal connecting base sliding against a semicircular pivotal member of said pivotal connecting block so that said grip and said main frame may be swung up and down accurately and stably with easy handling for aligning or bending said main frame relative to said grip.

2. The handcart as claimed in claim 1, wherein said projections of said pivotal connecting blocks of said joint assemblies contact with and stop by said blocking surface of said vertical grooves so that the adjustment of said grip and said main frame is more stable and simple.

* * * * *